United States Patent [19]

Mims

[11] 3,931,564

[45] Jan. 6, 1976

[54] APPARATUS FOR THE DIRECT CONVERSION OF THE KINETIC ENERGY OF CHARGED PARTICLES

[76] Inventor: L. Stewart Mims, 11391 Arroyo Ave., Santa Ana, Calif. 92705

[22] Filed: Dec. 6, 1973

[21] Appl. No.: 422,582

[52] U.S. Cl.............. 321/27 R; 307/58; 321/34
[51] Int. Cl............................ H02m 7/46
[58] Field of Search.......... 321/2, 27 R, 34; 307/58, 307/110, 151, 152

[56] References Cited
UNITED STATES PATENTS

| | | | |
|---|---|---|---|
| 2,423,614 | 7/1947 | Callaghan et al. | 321/2 |
| 2,906,938 | 9/1959 | Stellmacher | 321/2 |
| 3,390,320 | 6/1968 | Kammiller et al. | 321/2 |
| 3,409,818 | 11/1968 | Gillett | 307/58 |
| 3,532,960 | 10/1970 | Webb | 321/2 |
| 3,746,967 | 7/1973 | Koltuniak et al. | 321/27 R |

FOREIGN PATENTS OR APPLICATIONS

| | | | |
|---|---|---|---|
| 221,811 | 10/1968 | U.S.S.R. | 321/27 R |
| 1,438,352 | 10/1968 | Germany | 321/2 |

Primary Examiner—William H. Beha, Jr.
Attorney, Agent, or Firm—Philip M. Hinderstein

[57] ABSTRACT

Apparatus for converting the output of a high voltage D.C. source to a lower voltage and a higher current comprising a plurality of power conversion modules connected electrically in series across the D.C. source output so that each of the power conversion modules receives only a portion of the high voltage, each power conversion module including means for converting the high voltage portion to an A.C. signal and transformer means for reducing the voltage and increasing the current of such A.C. signal, the outputs of all of the transformer means being connected electrically in parallel. Each of the power conversion means includes a pair of capacitors which are charged by the high voltage D.C. source and which are alternately, periodically only slightly discharged to convert the D.C. voltage to an A.C. signal.

3 Claims, 5 Drawing Figures

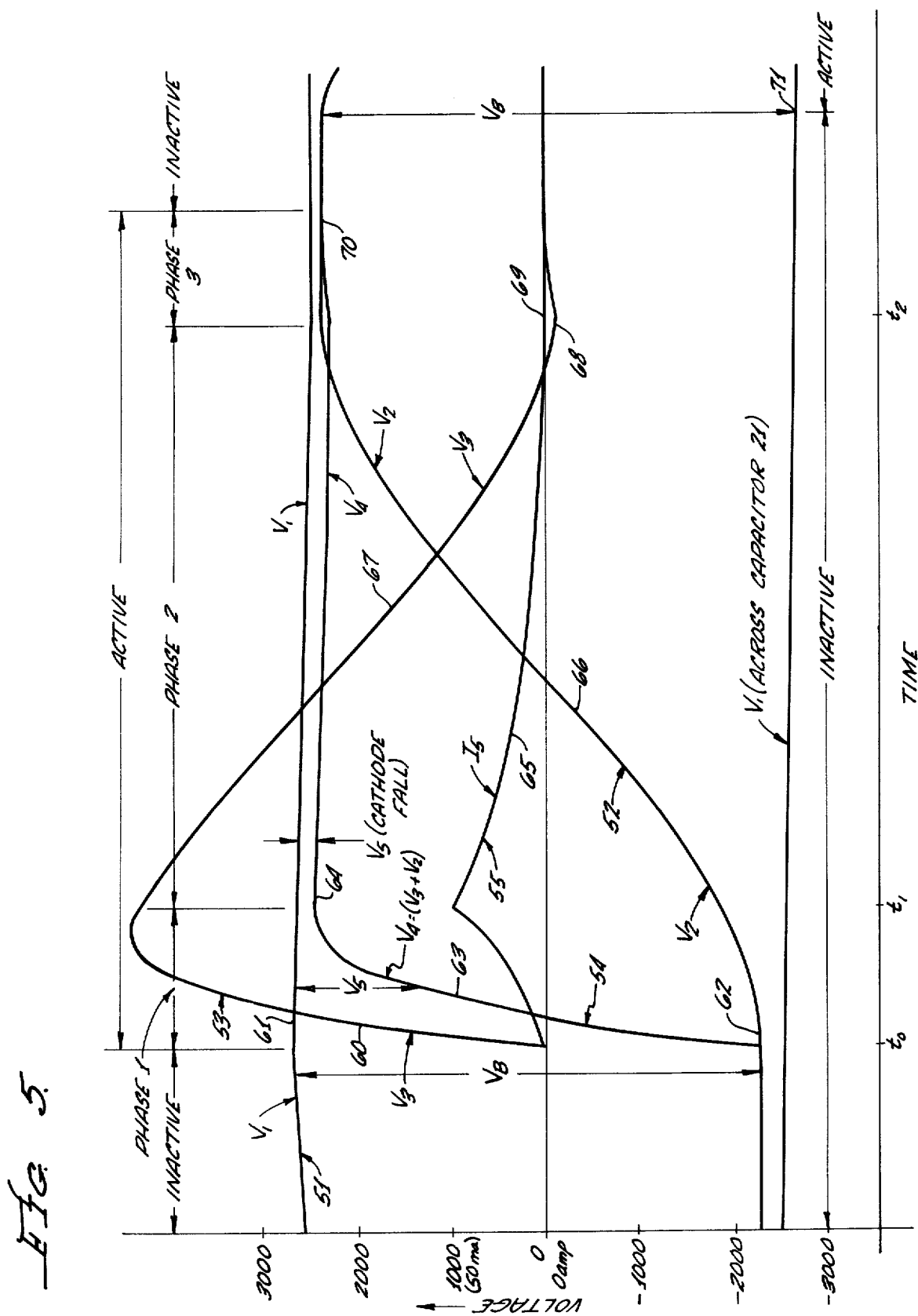

APPARATUS FOR THE DIRECT CONVERSION OF THE KINETIC ENERGY OF CHARGED PARTICLES

BACKGROUND OF THE INVENTION

1. Field of the Invention

The present invention relates to the direct conversion of the kinetic energy of charged particles and, more particularly, to a method and means for generating electrical energy in usable forms utilizing the kinetic energy of charged particles, such as those emitted by radioactive isotopes.

2. Description of the Prior Art.

Large amounts of radioactive fission products are produced each year in nuclear reactors. With the constantly decreasing availability of energy from conventional sources, there is a tremendous need to develop systems which utilize these fission products as sources of electrical energy.

Today's radioactive isotope power supplies first convert the nuclear energy to thermal energy whereupon the thermal energy is converted to electrical energy. Such systems are limited by the Carnot cycle efficiency inherent in heat cycles and need to operate at high temperatures. For example, the most commonly used radioisotope power supply is the radioisotope powered thermoelectric generator with efficiencies in the 1½% to 5% range. The high temperature thermionic converter has operated at up to 14% efficiency for short periods. Brayton cycle and Rankine cycle turbine systems have also operated at such high efficiencies, but are expensive and have relatively short unattended operating lives.

Since some radioactive radiations are largely electrical in nature, it is desirable that such electrical energy be converted directly to electrical energy of usable form. For example, beta particle emission comprises negatively charged particles having energies varying from low values to the order of two million volts. A preferred and widely available isotope is strontium-90, Sr-90, a beta emitter. This material is a fission product which is produced whenever uranium or plutonium fissions in a nuclear reactor. It has been estimated that the U.S. Atomic Energy Commission has presently 6½ billion curies of the waste by-product, Sr-90, stored in underground containers. Furthermore, current trends indicate that by 1980, commercial power reactors in this country alone will be producing Sr-90 at the rate of 1 billion curies per year. Operation of reactors to produce plutonium for military purposes is a continuing large source of supply of Sr-90.

In spite of the availability of Sr-90 and other radioisotopes, prior attempts to generate electrical energy directly therefrom, without resort to a heat cycle, have been expensive and inefficient. The reason for this is that the efficiency of nuclear batteries is sharply dependent on their operating voltages and voltages in excess of 300 kV have been required to achieve reasonable efficiencies. In the past, systems proposed for converting the high voltage produced in the battery to usable ranges allow the battery to drift out of its desirable performance region. More specifically, means suggested for reducing the high battery voltages to more convenient levels have included gas glow devices which have been used to modulate the high voltages thus producing alternating currents which can be stepped down in transformers to reasonable voltages. However, the circuits proposed in the past have permitted the battery to completely discharge so that the battery spends a portion of its cycle operating very inefficiently. Thus, when the battery is charging up, as it does following a discharge, the energetic particles emitted by the fuel have only a moderate field to climb and reach the anode with most of their energy left. This energy is simply wasted in heating the anode. Furthermore, because this type of battery tends to have a fairly long charge-up time, on the order of seconds, it would be caused to spend a great deal of time operating inefficiently. This system inefficiency raises the fuel requirement and the overall system cost.

SUMMARY OF THE INVENTION

According to the present invention, there is proposed a method and means for the direct conversion of the kinetic energy of charged particles, such as the particles emitted by radioactive isotopes, which solves the problems encountered heretofore. The present system does not resort to the heat cycle which characterizes radioisotope powered thermoelectric, thermionic, Brayton cycle, or Rankine cycle converters. The present system is not, therefore, limited by the Carnot cycle efficiency inherent in heat cycles and does not require high temperature operation with its attendant materials problems.

The present system maintains a good operating characteristic even with one or more stages shut down, thus having a high part-load reliability. Utilization of the present invention will make feasible the economic use of fission product radioisotope radiation energy. This is accomplished because the high voltage power produced by the present apparatus is efficiently modulated and transformed to a usable range.

The present system permits the battery to operate in a narrow voltage range where its efficiency and other operating characteristics are most desirable. This is achieved by distributing the high voltage potentials generated by the nuclear battery over a cascade of power conversion modules, each module being capable of withstanding but a portion of the total battery voltage generated. Each power conversion module converts the small battery current and high voltage to an A.C. signal which can then be stepped down in individual transformers to useful currents and voltages. Furthermore, each power conversion module performs this function while discharging only a small amount of the portion of the total battery voltage applied thereacross so that the voltage across the battery remains within a narrow operating range. The A.C. output of each module is rectified to a D.C. signal and the module outputs are connected electrically in parallel. The combined D.C. output can be filtered to provide energy in commercially usable forms.

OBJECTS

It is therefore an object of the present invention to provide apparatus for the direct conversion of the kinetic energy of charged particles.

It is a further object of the present invention to provide a method and means for generating electrical energy in usable form utilizing the kinetic energy in particles emitted by radioactive isotopes.

It is a still further object of the present invention to directly convert kinetic energy to electrical energy.

It is another object of the present invention to provide apparatus for the direct conversion of the kinetic energy of charged particles which does not resort to a heat cycle.

It is still another object of the present invention to provide power conversion means which has a high part-load reliability.

Another object of the present invention is the provision of a method and means for generating electrical energy in usable form from a nuclear battery where the battery operates in a narrow voltage range where its efficiency and other operating characteristics are most desirable.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 5 is a graph showing several of the voltages encountered in the circuit of FIG. 4.

DESCRIPTION OF THE PREFERRED EMBODIMENT

While any radioactive material which emits charged particles can be used to fuel the present invention, the preferred radioisotope is strontium-90, Sr-90, a beta emitter. Strontium-90 decays with a half-life of 28.6 years, emitting beta particles with a maximum energy of 540 KeV. The product resulting from the above process is yttrium-90, Y-90, which decays with a half-life of 64 hours, emitting electrons with a maximum energy of 2.28 MeV. The stable end product is zirconium-90, Zr-90. Thus, for each Sr-90 atom that disintegrates, one stable Zr-90 atom is ultimately produced along with two electrons.

Figure 1:
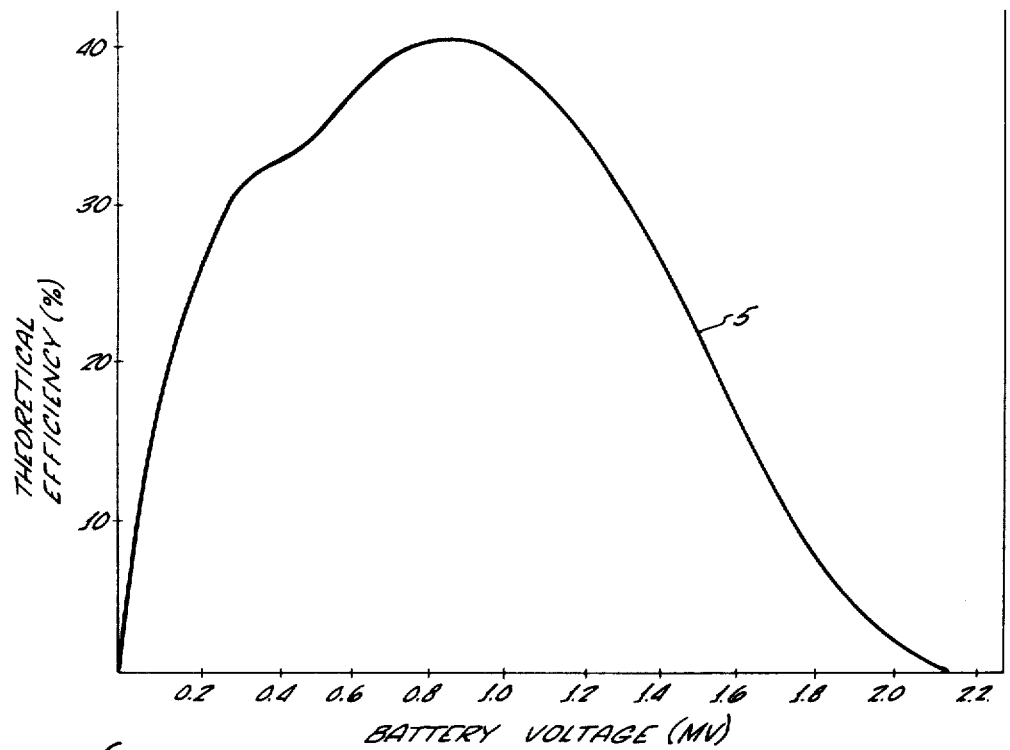
FIG. 1 is an idealized graph of the efficiency of a nuclear battery as a function of output voltage.

The efficiency of a nuclear battery using strontium-90 is shown in FIG. 1 as waveform 5 where theoretical efficiency in % is plotted versus battery voltage in megavolts. FIG. 1 shows a theoretical case which disregards such losses as leakage, self absorption in the fuel, and secondary electron emission losses. It is significant to note that the efficiency of the battery increases with increasing voltage up to a maximum efficiency of approximately 40% at 0.85 MV. At low voltages, the efficiency is quite low. Therefore, a major difficulty with the practical utilization of beta cells is the extremely high voltages that one must operate at to achieve reasonable levels of efficiency. Available circuit elements have proven incapable of withstanding the total generated battery voltage.

Prior means which have been suggested for reducing the high battery voltages to more convenient levels have included means for modulating the high voltages, thus producing alternating currents which can be stepped down to reasonable voltages. However, systems proposed heretofore have typically permitted a battery to charge to a certain value, to subsequently discharge, and to then charge up again. As can be seen from FIG. 1, while the battery is charging, it operates very inefficiently.

Figure 2:
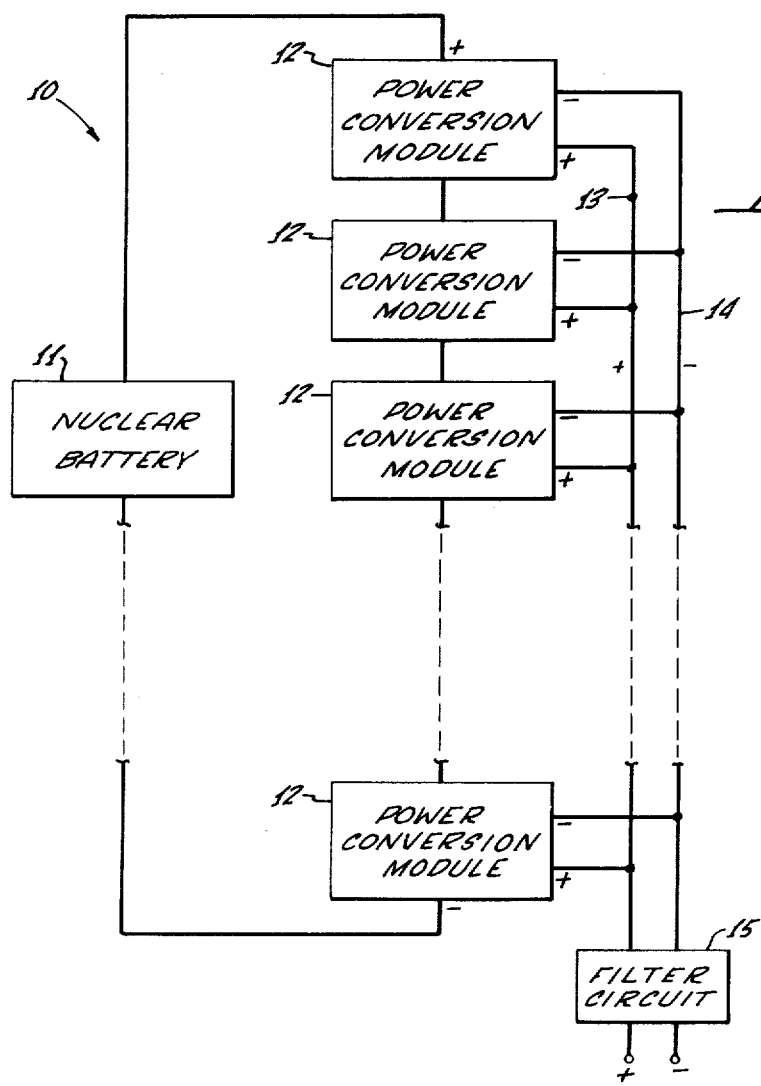
FIG. 2 is a schematic block diagram of the present apparatus for the direct conversion of the kinetic energy of charged particles.

Referring now to FIG. 2, there is shown a preferred form of apparatus, generally disignated 10, for directly converting the kinetic energy of charged particles emitted within a nuclear battery or any other high voltage D.C. source 11. Nuclear battery 11 is connected in series with a plurality of identical power conversion modules 12. As will be described more fully hereinafter, each power conversion module 12 is capable of withstanding only a portion of the total voltage generated by battery 11. Each power conversion module 12 includes means for converting its portion of the voltage of battery 11 to an A.C. signal and transformer means for reducing the voltage and increasing the current of the A.C. signal to a useful level. Each module 12 also includes means for rectifying the transformed A.C. signal to a D.C. signal. The outputs of modules 12 are connected electrically in parallel to output lines 13 and 14. The combined D.C. output of modules 12 may be filtered in circuit means 15 to provide energy in commercially usable forms.

Figure 3:
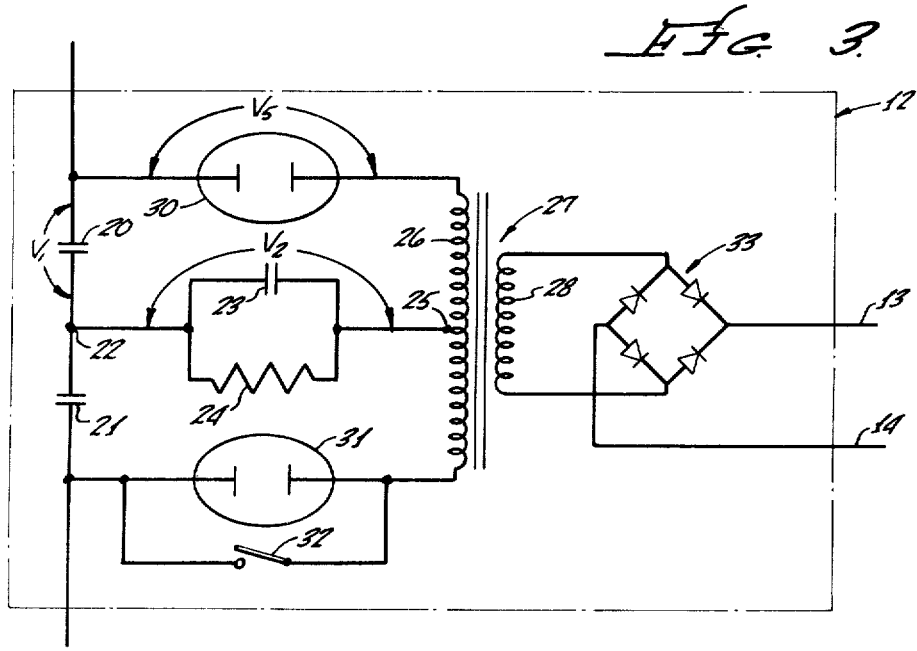
FIG. 3 is a schematic diagram of a preferred embodiment of power conversion module for use in the apparatus of FIG. 2.

Referring now to FIG. 3, there is shown a preferred embodiment of power conversion module 12 including a pair of voltage divider capacitors 20 and 21 connected in series across the input of module 12. Thus, each power conversion module includes two capacitors, all of the capacitors being connected electrically in series, thus dividing the output voltage of battery 11 by the number of capacitors. Therefore, regardless of which power conversion module 12 is being used at any given time, the total voltage across battery 11 is shared and divided by capacitors 20 and 21 in modules 12.

In general, modules 12 will act to pass a charge of electrons, module by module, from the negative terminal up to the positive terminal of system 10. As will appear more fully hereinafter, the key to efficient operation is that none of capacitors 20 or 21 discharges more than a small portion of its charge so that the voltage of battery 11 is maintained in an efficient range.

In each module 12, the junction 22 between capacitors 20 and 21 is connected to one side of the parallel combination of a capacitor 23 and a resistor 24, the other side of which is connected to the center tap 25 of the primary 26 of a transformer 27. The opposite ends of primary 26 are connected to first electrodes of a pair of gas glow tubes 30 and 31, the other electrodes of which are connected to the other sides of capacitors 20 and 21, respectively. Gas glow tube 31 has a switch 32 connected thereacross to short tube 31 for reasons which will appear more fully hereinafter. Finally, transformer 27 has a secondary 28 which is connected to the inputs of a conventional diode bridge 33, the outputs of which are connected to lines 13 and 14.

Referring now to FIGS. 2 and 3, before battery 11 is turned on, switches 32 of all modules 12 are closed. This means that capacitors 23 will all be charged in the same direction as voltage divider capacitors 21. When battery 11 or other high voltage source is connected to modules 12, switches 32 are opened and operation can commence.

Prior to breakdown, the voltage across gas glow tube 30, $V_3$, is equal to the voltage across capacitor 20, $V_1$, plus the voltage across capacitor 23, $V_2$, approximately equal to the sum of the voltages across capacitors 20 and 21 in series. The current from battery 11 causes the voltage $V_1$ across capacitor 20 to increase until $V_5$ rises above the breakdown voltage of gas glow tube 30, $V_B$. When this occurs, tube 30 fires, passing current through the upper half of primary 26 of transformer 27. This generates a current in secondary 28 of transformer 27, which current is increased over the primary current by the turns ratio of transformer 27. The current in secondary 28 is rectified by bridge 33 and added in parallel to the outputs of the other modules 12 and is then passed to filter circuit 15. Diode bridge 33 is also necessary to decouple the different modules 12 from each other and from filter circuit 15.

The current passing through the upper half of primary 26 also induces a voltage in the lower half, which voltage is applied across glow tube 31 in a direction which prevents the firing thereof during this portion of the cycle. This will appear more fully hereinafter during the discussion of the waveforms of FIG. 5.

The voltage across tube 30 decreases as the gas glow current increases until the region of glow discharge with "normal" cathode fall is reached. At that point, the gas glow voltage remains constant with changes in current. Once the normal glow region is reached, the current can increase or decrease but the voltage $V_5$ across tube 30 remains constant.

The current passing through tube 30 and the active upper half of primary 26 of transformer 27 charges up capacitor 23 while slightly discharging capacitor 20. In this regard, the value of capacitor 20 is much greater than the value of capacitor 23 so that capacitor 23 charges much more rapidly than capacitor 20 discharges. As capacitor 23 becomes more highly charged, the voltage across each half of transformer primary 26 drops to zero and may slightly overshoot. It is essential that the amount of overshoot be kept to less than the cathode fall of tubes 30 and 31. If the voltage overshoot is ever more than the cathode fall, the voltage induced in the inactive transformer half becomes sufficient to turn on the inactive gas glow tube, leading to the simultaneous operation of both of tubes 30 and 31. This would lead to the substantial discharge of both of capacitors 20 and 21 in a single module 12, with a corresponding reduction in the output voltage of battery 11, just the situation the present invention is designed to prevent.

On the other hand, each power conversion module 12 is designed so that capacitor 23 becomes fully charged in a direction opposite to that of the original charge at the instant that the voltage $V_3$ across the upper half of transformer primary 26 is at its most negative value, and the gas glow current is zero. Under these conditions, gas glow tube 30 ceases to conduct. The magnetic field of transformer 27 then collapses, releasing the residual energy stored in both halves of primary 26 into secondary 28 from which it is rectified by bridge 33 and passed to output lines 13 and 14.

During this time, capacitor 21, which had previously been slightly discharged during its active portion of the cycle, is gradually being charged due to the current of battery 11. Eventually, gas glow tube 31 is ignited by the sum of the voltages across capacitor 21 and the newly charged capacitor 23. The second half of the cycle is thus quite similar to the first. During the operation of gas glow tube 31, capacitor 20, which had been slightly discharged during the operation of tube 30, as explained previously, begins to recharge so that it is ready to recycle at a later time.

In practice, switch 32 can be any of a variety of means for initially charging capacitor 23. Since apparatus 10 is designed primarily for long term operation, start-up will occur only once in a matter of years. Various start-up methods include optical firing of alternate gas glow tubes 31, use of a firing grid in each of tubes 31, or the use of burn-out wires. An rf signal passed through a coil of wire surrounding gas glow tubes 31 may also be used to turn them on.

Resistor 24 in parallel with capacitor 23 is used to stabilize the circuit of each power conversion module 12. If there is an imbalance between the circuit halves, resistor 24 will preferentially bleed off during the half cycle which would otherwise cause the greatest voltage across capacitor 23 to build up, eventually leading to excessive voltage across capacitor 23 and one of the capacitors 20 or 21.

Figure 4:
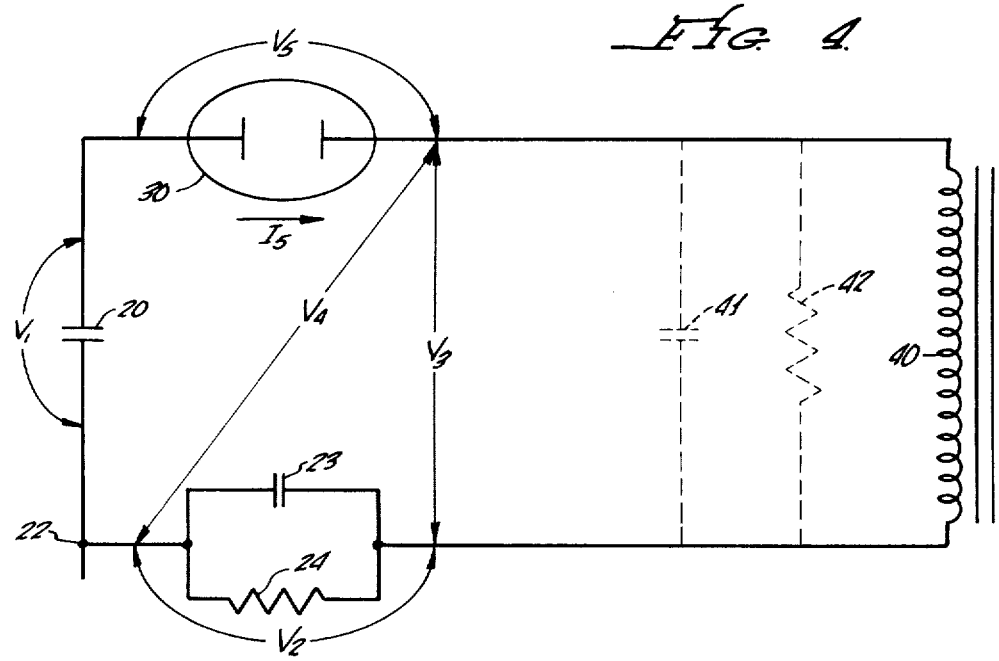
FIG. 4 is a diagram showing the virtual components of a portion of the circuit of FIG. 3.

Referring now to FIGS. 4 and 5, a more detailed analysis of the operation of each of power conversion modules 12 will be provided. Advantage is taken of the fact that a center tapped transformer circuit can be studied in halves, each half being a mirror image of the other. Thus, FIG. 4 shows such a circuit half including capacitors 20 and 23, resistor 24, and gas glow tube 30. Advantage is also taken of the fact that a transformer primary, with a resistive load in the secondary, may be accurately represented by an inductance 40 in shunt with a parasitic capacitance 41 and a resistive load which is reflected back from the secondary and designated by resistor 42. The voltage across capacitor 20 will be designated $V_1$, the voltage across capacitor 23 will be designated $V_2$, the voltage across the shunt combination of inductance 40, capacitance 41, and resistance 42 will be designated $V_3$, the combined voltage across capacitor 23 and inductance 40, $V_2+V_3$, will be designated $V_4$, and the voltage across gas glow tube 30 will be designated $V_5$.

Considering first gas glow tube 30, it may be a conventional voltage breakdown tube containing a gas, such as argon, at a low pressure such as 20–45 mm of Hg. Such a tube might contain two parallel copper disc electrodes, spaced 15 centimeters apart. When the voltage across such a tube reaches the breakdown voltage, $V_B$, the current suddenly increases with a decrease in interelectrode voltage. The voltage decreases to a value called the "normal" cathode fall. At that point, the gas glow voltage remains constant with changes in current up to the so-called abnormal glow condition, which is reached at about $10^{-2}$ amperes, depending on the cathode area. Such operation is not contemplated in the present design.

With reference to FIG. 5, $V_1$ is shown as waveform 51, $V_2$ is shown as waveform 52, $V_3$ is shown as waveform 53, $V_4$ is shown as waveform 54, and the current $I_5$ through gas glow tube 30 is shown as waveform 55. It should also be noted that $V_5$ is the difference between $V_1$ and $V_4$. In the following discussion, it will be assumed that $V_B$ is 5,000 volts and that the normal cathode fall is 200 volts.

The power producing pulse will be described in three phases, indicated as Phase 1, Phase 2, and Phase 3. Prior to the start of Phase 1, the voltage across capacitor 23, $V_2$, will be assumed to be at −2,400 volts, for reasons which will appear more fully hereinafter. At this time, the voltage across capacitor 20, $V_1$, having previously been slightly discharged, continues to charge towards +2,600 volts. When $V_1$ reaches 2,600 volts, the voltage across gas glow tube 30, $V_5$, which is the sum of $V_1$ and $V_2$, reaches 5,000 volts, the breakdown voltage, $V_B$, and tube 30 turns on.

When gas glow tube 30 turns on, at $t_0$, marking the beginning of Phase 1, so that current $I_5$ flows therethrough, a voltage appears across inductance 40. This current permits charge to accumulate on capacitor 41 (see waveform 53). Furthermore, a similar, equal and opposite voltage appears across the inactive half of transformer primary 26, permitting a similar charge to accumulate in the other parasitic capacitance. A current is also produced in resistance 42 producing the useful output of the present circuit.

Since the value of parasitic capacitance 41 is much smaller than that of capacitance 23 which, in turn, is smaller than that of capacitance 20, the voltage $V_3$ across capacitor 41 rises rapidly, at 60, much faster than any change in voltages $V_1$, at 61, or $V_2$, at 62. The combined voltage across capacitors 23 and 41, $V_4$, rises during Phase 1, as seen at 63, to +2,400 volts at which point the normal cathode fall portion of the gas glow characteristic is reached. Because of the rapid change in the voltage across capacitor 41, the point of zero resistance, i.e. no voltage change for a given current change, across gas glow tube 30 is reached with the original charge across capacitors 20 and 23 only slightly changed.

In Phase 2, which begins at $t_1$ when the voltage $V_5$ across gas glow tube 30 reaches the normal cathode fall, at 64, current flowing through inductance 40, as seen at 65, gradually charges capacitor 23 to the full +2,400 volts, as seen at 66, while the voltage $V_3$ across capacitor 41 drops to a small value, as seen at 67. During this time, the voltage $V_5$ across tube 30 remains constant. It is essential that the combination of capacitors 20, 23, and 41, inductance 40, and resistance 42 be sufficiently damped so that inductance 40 is limited in the amount of reverse voltage it can put across capacitance 41. In other words, if the voltage across capacitance 41 is ever greater than the normal cathode fall, the inactive portion of primary 26 of transformer 27 can turn on the inactive gas glow tube 31 and the system would malfunction. If this does not occur, the peak reverse voltage across inductance 40, at 68, corresponds to zero gas glow tube current, at 69, which turns off tube 30, thus marking the start of Phase 3, at $t_2$. In Phase 3, the transformer magnetic field collapses and the half cycle is completed, leaving capacitor 23 now charged to +2,400 volts, as seen at 70. When capacitor 21 becomes fully charged to −2,600 volts, at 71, the voltage across gas glow tube 31 reaches 5,000 volts, $V_B$, and the other half of the cycle commences.

It can thus be seen that each discharge of tubes 30 and 31 can be separable into three phases. In Phase 1, the current increases rapidly after the breakdown voltage has been reached. The current characteristics are largely determined by the gas glow dynamics. Once the voltage $V_4$ across capacitors 23 and 41 has risen sufficiently to reduce the gas glow tube voltage to that of the cathode fall, the zero resistance region of the gas glow curve has been reached. In Phase 2, inductance 40 will continue to dump its charge into capacitance 23 and will continue to pass charge from capacitance 20 through gas glow tube 30, also into capacitance 23. The result is that the voltage $V_3$ across capacitance 41 gradually drops, the voltage $V_2$ across capacitance 23 rises, the voltage $V_1$ across capacitance 20 drops slightly, while the voltage $V_5$ across gas glow tube 30 remains constant. During this time, the current $I_5$ through tube 30, now independent of gas glow characteristics, is determined entirely by the circuit parameters. Finally, the damped circuit causes the current to drop to zero and gas glow tube 30 turns off, initiating the start of Phase 3. In Phase 3, the energy left in both the active and inactive inductances 40 and in capacitors 41 is passed out to the secondary.

It can therefore be seen that in accordance with the present invention, there is provided a method and means for the direct conversion of the kinetic energy of charged particles, such as the particles emitted by radioactive isotopes, which solves the problems encountered heretofore. The present system does not resort to the heat cycle which characterizes radioisotope powered thermoelectric, thermionic, Brayton cycle, or Rankine cycle converters. The present system is not, therefore, limited by the Carnot cycle efficiency inherent in heat cycles and does not require high temperature operation with its attendant materials problems.

The present system maintains a good operating characteristic even with one or more stages malfunctioning, thus having a high part-load reliability. Utilization of the present invention will make feasible the economic use of fission product radioisotope radiation energy. This is accomplished because the high voltage power produced by the present invention is efficiently modulated and transformed to a usable range.

In apparatus 10, battery 11 is permitted to operate in a narrow voltage range where its efficiency and other operating characteristics are most desirable. This is achieved by distributing the high voltage potential generated by battery 11 over a cascade of power conversion modules 12, each module 12 being capable of withstanding but a portion of the total battery voltage generated. Each module 12 converts the small battery current and high voltage to an A.C. pulse which can then be stepped down in individual transformers 27 to useful currents and voltages. Furthermore, each module 12 performs this function while discharging only a very small amount of its portion of the total battery voltage applied thereacross so that the voltage across battery 11 remains within a narrow operating range. The A.C. output at each module 12 is rectified to a D.C. signal and the module outputs are connected electrically in parallel to output lines 13 and 14. The combined D.C. output can be filtered to provide energy in commercially usable forms.

While the invention has been described with respect to a preferred physical embodiment constructed in accordance therewith, it will be apparent to those skilled in the art that various modifications and improvements may be made without departing from the scope and spirit of the invention. For example, it will be obvious that other circuit arrangements can be utilized in modules 12 to achieve the results obtainable with the specific circuit shown. Accordingly, it is to be understood that the invention is not to be limited by the specific illustrative embodiment, but only by the scope of the appended claims.

I claim:

1. Apparatus for converting the output of a high voltage D.C. source to a lower voltage and a higher current comprising a plurality of power conversion means, each of said power conversion means including:
   a pair of capacitors, all of the capacitors of said plurality of power conversion means being connected electrically in series across said D.C. source output, said D.C. source charging said capacitors, each of said power conversion means receiving only a portion of said high voltage;

transformer means including a primary and a secondary; and means for alternately, periodically discharging only a small portion of the charges on said capacitors for converting said high voltage portion to an A.C. signal, said discharging means comprising:

a second capacitor connected between the junction between said pair of capacitors and the center of said primary of said transformer means; and a pair of switching means connected between the other sides of said pair of capacitors and the opposite ends of said primary of said transformer means, said switching means comprising gas glow tubes, said transformer means reducing the voltage and increasing the current of said A.C. signal, the secondaries of said transformer means of each of said power conversion means being connected electrically in parallel.

2. Apparatus according to claim 1 wherein the capacitance value of each capacitor of said pair of capacitors is much greater than that of said second capacitor.

3. Apparatus according to claim 1 wherein each of said power conversion means further includes:

means coupled to said secondary of said transformer means for electrically isolating the output of said transformer means of each power conversion means from the outputs of the other power conversion means.

* * * * *